United States Patent [19]

Osborn et al.

[11] 4,014,441
[45] Mar. 29, 1977

[54] BRICK TIE SETTING MACHINE

[75] Inventors: William P. Osborn, Whittier; Frank S. Pearne, Solano Beach, both of Calif.

[73] Assignee: Aircraft Mechanics, Inc., Downey, Calif.

[22] Filed: May 14, 1975

[21] Appl. No.: 577,184

[52] U.S. Cl. .............................. 214/6 A; 198/374; 198/427; 214/10.5 S
[51] Int. Cl.[2] ........................................ B65G 57/26
[58] Field of Search ............ 214/6 A, 6 P, 10.5 R, 214/10.5 S; 198/235, 374, 427, 429; 294/63 R

[56] References Cited

UNITED STATES PATENTS

| | | | |
|---|---|---|---|
| 2,103,649 | 12/1937 | Sullivan | 214/10.5 R |
| 2,956,696 | 10/1960 | Drackengren | 214/6 A |
| 3,667,622 | 6/1972 | Kamphues et al. | 214/6 A |
| 3,716,264 | 2/1973 | Pearne et al. | 214/6 A X |

FOREIGN PATENTS OR APPLICATIONS

| | | | |
|---|---|---|---|
| 1,608,681 | 9/1969 | Germany | 214/6 A |

Primary Examiner—L. J. Paperner
Attorney, Agent, or Firm—McNenny, Pearne, Gordon, Gail, Dickinson & Schiller

[57] ABSTRACT

A novel and improved brick setting machine as disclosed, which is operable to automatically produce stacks of green brick suitable for firing and which have a high degree of stability to permit their being transported from one location to another by fork lift trucks or the like. The stack includes a plurality of grids of brick, some of which consist of lengthwise aligned rows of brick spaced from each other by longitudinal lanes and crosswise rows of aligned brick, extending perpendicular to the lengthwise rows wherein at least some of the brick in the crosswise rows are spaced from each other to form lateral lanes. The patterns within the grids are arranged so that the lateral and lengthwise lanes are superimposed so that the patterns of lengthwise brick and crosswise brick can be consolidated into the desired grids by automatic means including grippers which extend along the longitudinal and lateral lanes. The pattern of grids is arranged to provide a high degree of tieing between the various rows of brick, making up the stack so that the entire stack is highly stable. The bottom grid is soldier set to permit gripping and transfer of the entire grid by fork truck or the like. The machine for forming the stack includes a first sub-assembly for establishing the patterns of lengthwise rows of brick and a second sub-assembly for establishing the corresponding patterns of crosswise rows of brick.

18 Claims, 13 Drawing Figures

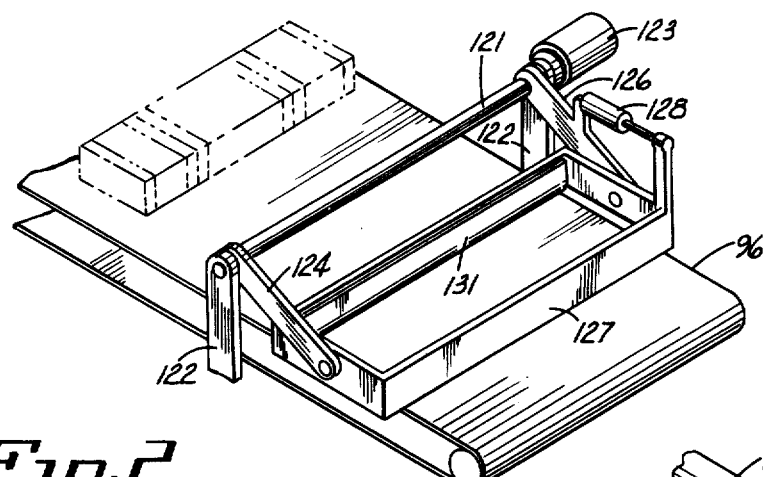
Fig. 2
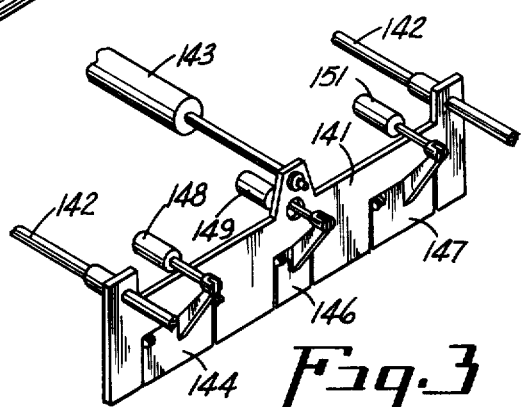
Fig. 3
Fig. 4a
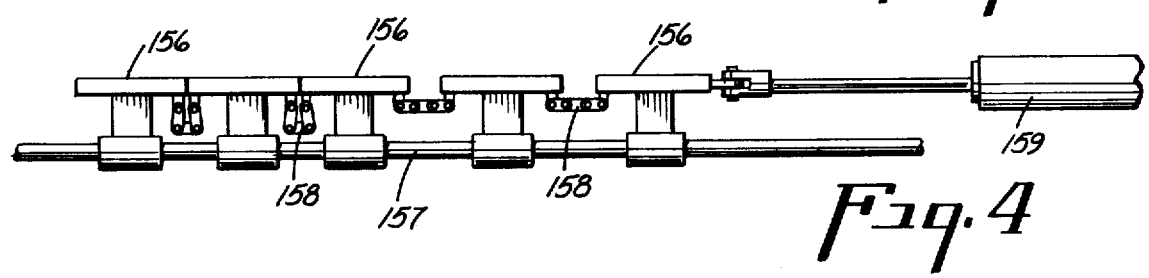
Fig. 4
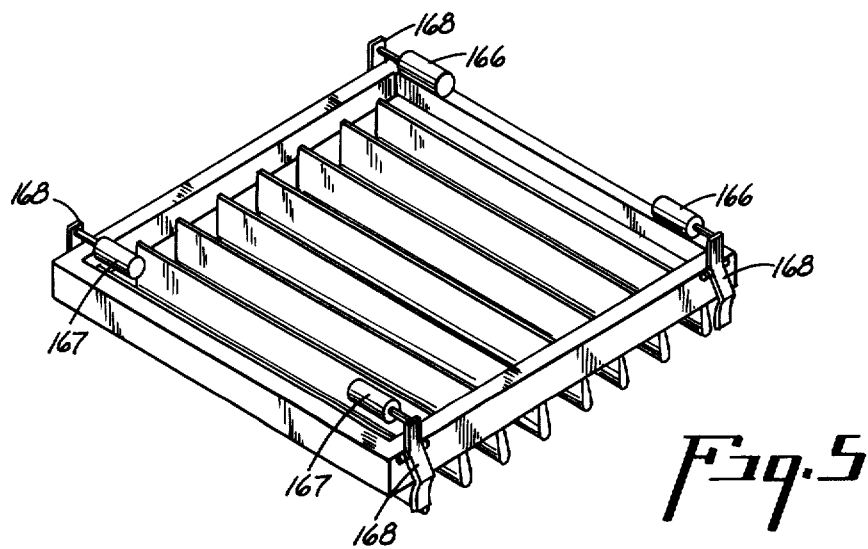
Fig. 5

BRICK TIE SETTING MACHINE

BACKGROUND OF THE INVENTION

This invention relates generally to the manufacture of brick or the like, and more particularly to a novel and improved tie-setting machine, which operates to automatically set a novel and improved stable stack of green brick. Such stack is sufficiently stable to permit its transfer to and from a kiln in which the brick are fired.

PRIOR ART

In many instances, automatic handling equipment is provided to set green brick, often in stacks, for transfer to a kiln for firing and for removal of the fired brick from the kiln. In some instances the stack is formed on a kiln car which transports the brick through the kiln for firing. In other instances, the stack is transported by a fork lift truck or the like into and out of the kiln. In both instances the stack is arranged in open patterns so that the firing heat is distributed through the stack to insure proper firing of all of the brick within the stack. Further, in both instances, the arrangement of the stack must be sufficiently stable to permit the required handling or moving of the stack.

The U.S. Pat. Nos. 3,474,917; 3,478,393; 3,478,896; 3,487,954; 3,589,495 and 3,716,264, all assigned to the assignee of the present invention, disclose machines for handling brick in the green state, and in most of these patents, disclose machines for setting or stacking the brick in a manner suitable for transfer on a kiln car for firing.

SUMMARY OF THE INVENTION

There are several aspects to the present invention. In accordance with one aspect of the invention, a novel and improved stack of brick is provided which can be automatically produced by power equipment. The stack is arranged to insure proper firing of all of the brick in the stack and to provide superior stability. In the illustrated embodiment, a stack is arranged to permit movement of the stack by a fork-type lift truck without requiring a supporting platform. However, a stable stack in accordance with this invention may be used in other systems, for example, in a system employing a typical kiln car.

In the illustrated stack of brick in accordance with the present invention, a plurality of grids arranged in patterns which differ from the patterns of brick in the adjacent grid above and below is included. The stack includes grids having a plurality of spaced lengthwise rows and a plurality of spaced crosswise rows extending perpendicular to the lengthwise rows. The lengthwise rows are spaced from each other by longitudinal lanes and the crosswise rows include brick which are spaced from each other at their ends by lateral lanes extending perpendicular to the direction of the crosswise rows. The lateral lanes are located in the pattern so that they extend along longitudinal lanes to facilitate the gripping of the patterns of brick and assembling of the lengthwise and crosswise rows in the desired pattern of the grid.

In accordance with another aspect of this invention, a novel and improved method of forming a stack of brick suitable for firing in a kiln is provided.

In accordance with still another aspect of this invention, a novel and improved machine is provided which operates to automatically produce a stack of brick suitable for firing.

These and other aspects of this invention are disclosed in the following description and drawings.

BRIEF DESCRIPTION OF THE DRAWINGS

FIG. 2 is an enlarged fragmentary schematic perspective view of an inverter, which operates to invert selected brick prior to their being positioned in the stack;

FIG. 3 is a schematic perspective view illustrating a pusher for use in moving rows of brick from the spreader table to the marshalling conveyors;

FIG. 4 is a schematic side elevation illustrating one arrangement of the spreader bars and their operating mechanism;

FIG. 4a is a cross section of the spreader illustrated in FIG. 4;

FIG. 5 is a schematic perspective view of one of the gripper transfers illustrating the mechanism for compacting selected rows of brick;

DETAILED DESCRIPTION OF THE DRAWINGS

FIGS. 1 through 5 illustrate the setting or stacking machine in accordance with the present invention. The stack formed by the machine is illustrated in FIG. 6 in its entirety and the various grids forming the stacks are illustrated in FIGS. 7 through 12.

Figure 6:
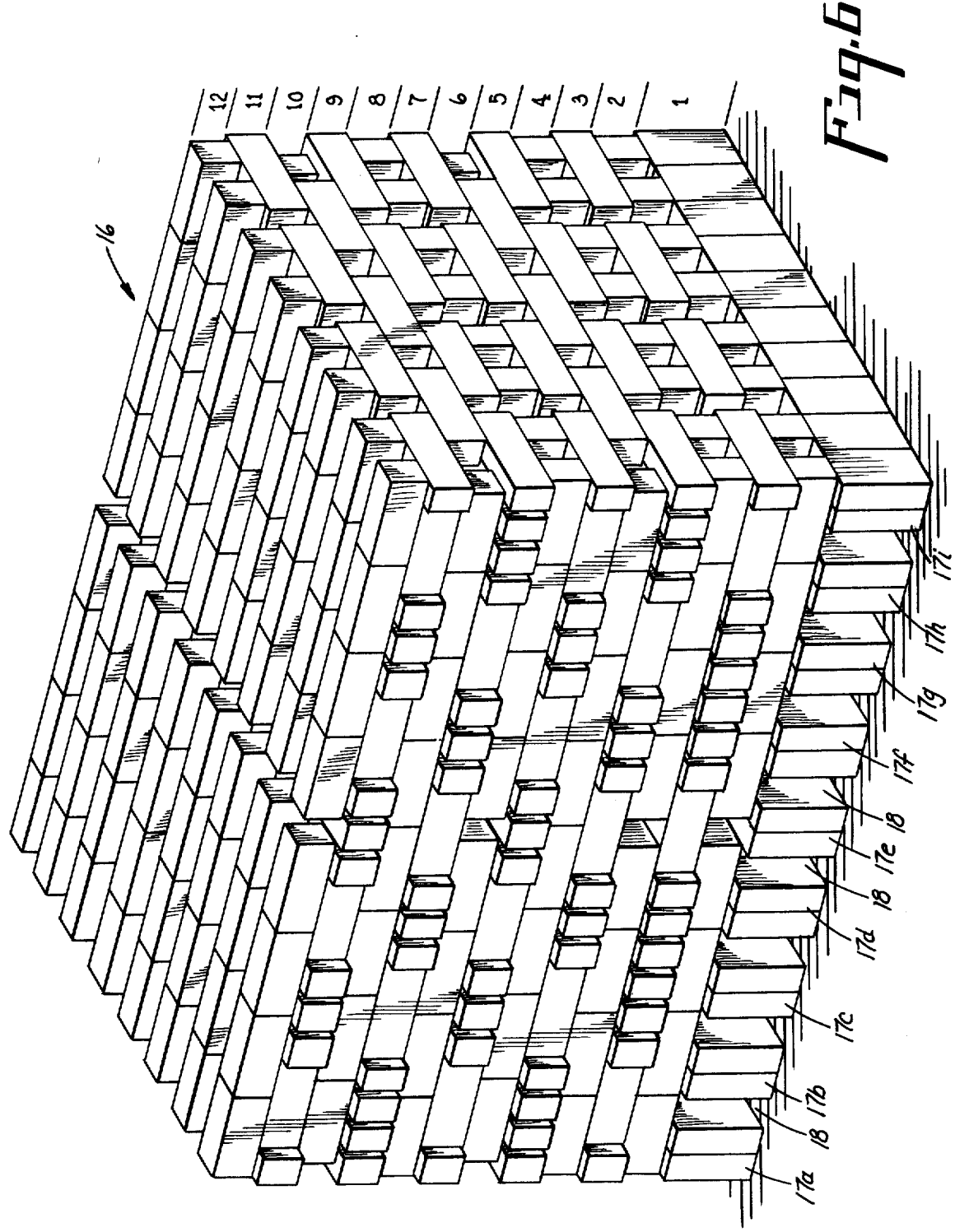
FIG. 6 is a perspective view of a stack of brick incorporating the present invention, in which the stack consists of twelve grids.
Figure 7:
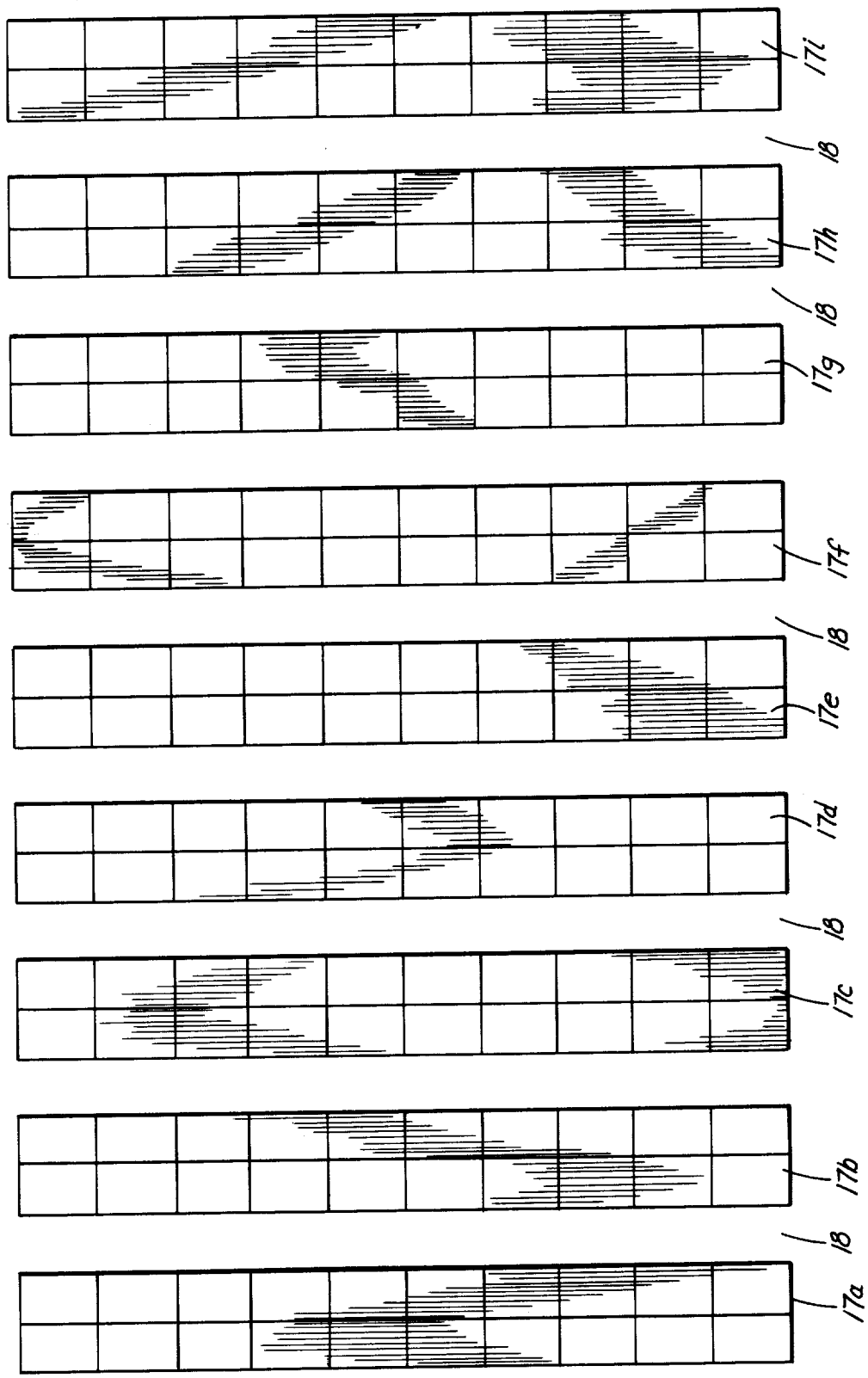
FIG. 7 is a plan view illustrating the arrangement of the brick in the first or bottom grid.

Referring to FIG. 6, the stack indicated generally at 16, consists of twelve grids which will be referred to by number as indicated on the right side of FIG. 6. Grid No. 1, the lowermost grid, is soldier set in that the bricks of this grid are set on their ends. The remaining grids No. 2 through No. 12, consists of patterns of brick set on their sides in rows. The soldier set grid No. 1 (best illustrated in FIG. 7) consists of nine double rows of brick with each row including ten pairs of brick. Consequently, there are 180 brick in the bottom grid.

Each double row 17a through 17i is spaced from the next adjacent row by a space 18, proportioned to receive one prong of a fork lift truck of the type generally illustrated in the U.S. Pat. No. 2,609,113. Grippers are provided on each prong to enable the gripping of the sides of each double row so that the entire stack can be supported by gripping all of the brick in grid No. 1. While gripped, the stack can be transported by the lift truck from one location to another. When the stack is positioned at a delivery point, the stack is set down on grid No. 1 and released to allow withdrawal of the prongs of the fork.

Figure 8:
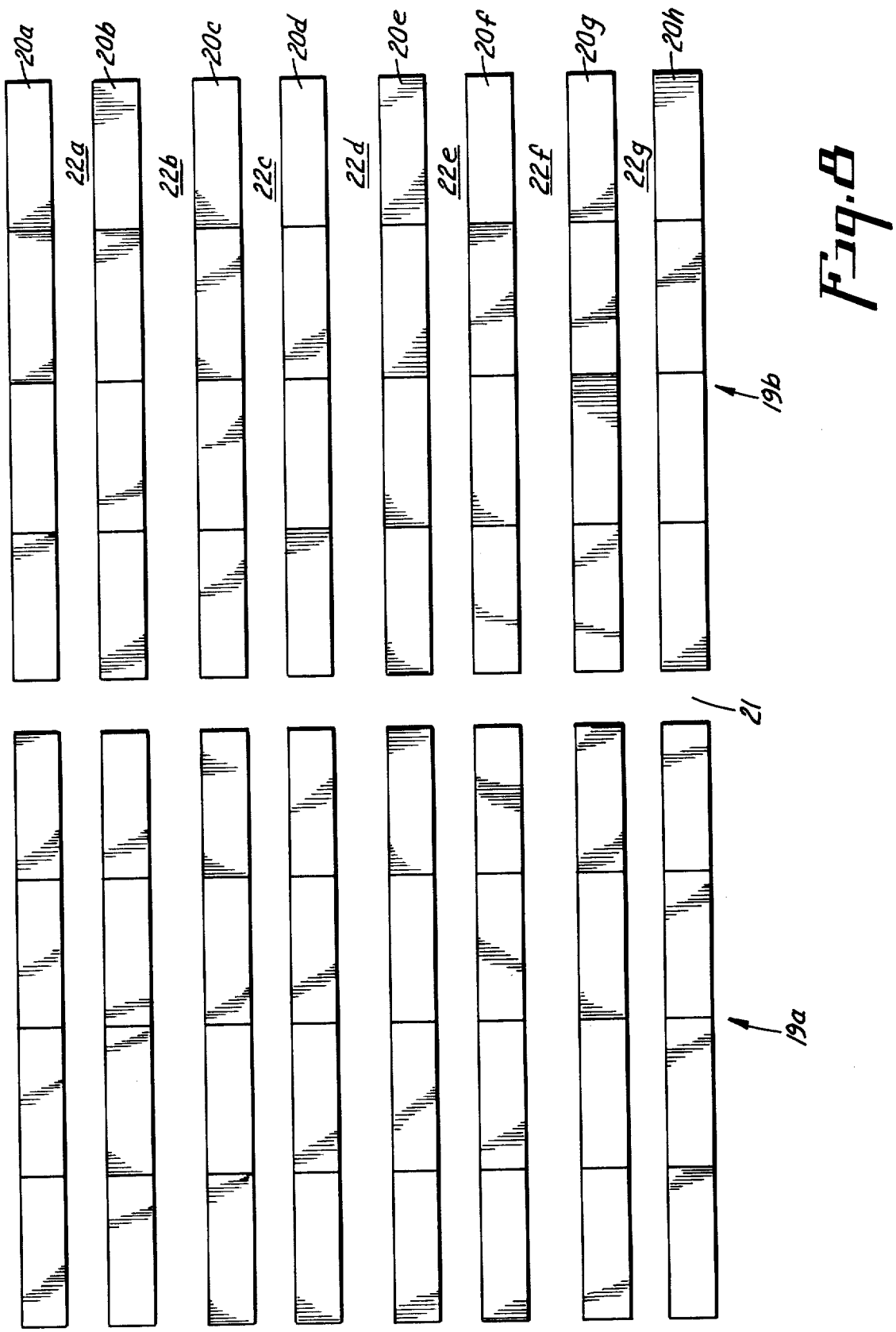
FIG. 8 illustrates the arrangement of the brick in the second, fourth, eighth and twelfth grids from the bottom of the stack.

The pattern of grid No. 2 is illustrated in FIG. 8. This same pattern is repeated in grids No. 4, No. 8 and No. 12. This pattern consists of eight rows, 20a through 20h, of lengthwise aligned brick in which each row includes two groups, 19a and 19b, of four lengthwise abutting brick spaced from the associated group by a space 21. Grid No. 2 is positioned on top of grid No. 1 with the rows of grid No. 2 extending laterally with respect to the rows 17a through 17i of grid No. 1. The space 21 is proportioned so that it is located over the center row 17e of grid No. 1 and the adjacent ends of the bricks in associated rows engage and are supported by the bricks of row 17e. The eight longitudinal rows 10a through 20h are spaced from the next adjacent row by longitudinal lanes 22a through 22g. These lanes are referred to as longitudinal lanes because they extend in the direction of the length of the brick within the grid which form the lanes. It should be noted that the lanes 22a, 22c, 22e and 22g have equal width, but are not as wide as the lanes 22b, 22d and 22f. Since there are eight rows in grid No. 2, each consisting of eight brick, grid No. 2 has 64 brick therein.

Figure 9:
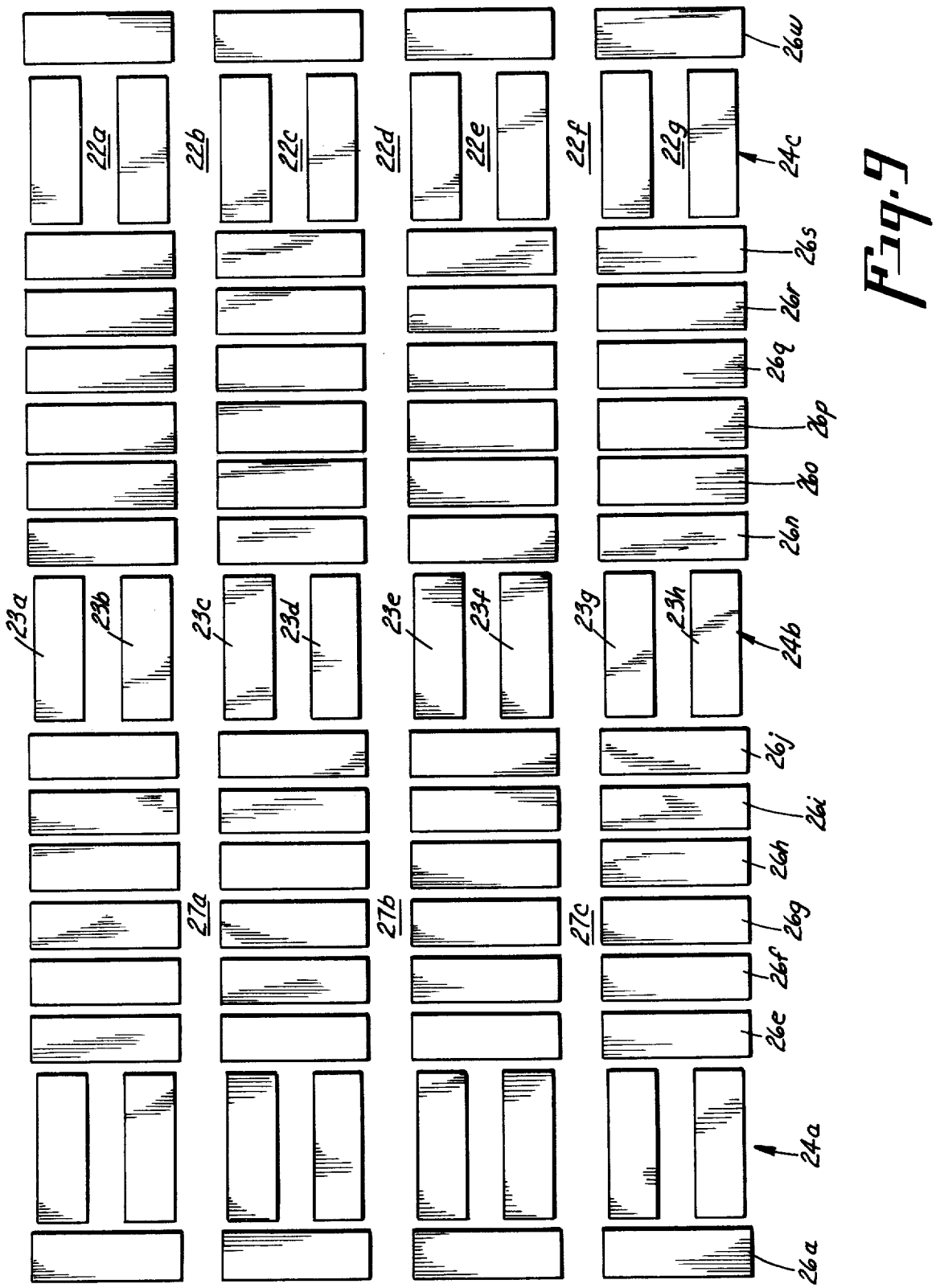
FIG. 9 illustrates the grid arrangement for the third grid from the bottom of the stack.

Grid No. 3 is illustrated in FIG. 9. This is the first grid consisting of a combination of lengthwise rows and crosswise rows. In this grid there are again, eight lengthwise rows, 23a through 23h. Each lengthwise row 23a through 23h includes three lengthwise aligned but spaced brick, which cooperate to form three spaced groups, 24a through 24c. These groups extend across the stack, but the brick are positioned in a lengthwise aligned arrangement so that the rows 23a through 23h extend lengthwise of the stack. Here again, each row 23a through 23h is spaced from the adjacent row to provide longitudinal lanes 22a through 22g, which correspond to the corresponding longitudinal lanes in grid No. 2.

Grid No. 3, however, includes crosswise rows 26 of aligned but spaced brick. These crosswise rows are designated rows 26a, 26e through 26j, 26n through 26s, and 26w. It should be noted that in designating the rows, three letters have been eliminated between the rows 26a and 26e, between the rows 26j and 26n, and between the rows 26s and 26w. These lateral rows are omitted in this grid to provide the space for the crosswise groups 24a through 24c, respectively.

Each of the rows 26 includes four lengthwise aligned, but spaced brick. Between the adjacent ends of each brick in each of the rows 26 is a lateral lane 27a through 27c. These lanes are referred to as lateral lanes because they extend in a direction perpendicular to the lengthwise direction of the brick in the rows 26a through 26w. It should be noted that these lateral lanes 27a through 27c are aligned with the longitudinal lanes 22b, 22d and 22f, which are the wider of the longitudinal lanes. It should also be noted that the spacing between the adjacent ends of the bricks in the rows 26 is less than the width of the lanes 22b, 22d and 22f, so that the ends of the brick defining the lateral lanes 27a through 27c are closer together than the adjacent faces of the brick in the rows 23, which define the lanes 22b, 22d and 22f. This lesser spacing provides clearance for the grippers which grip the end faces of the crosswise rows 26, as is discussed in detail below. It should be noted that the crosswise rows of brick provide lateral tieing between the lengthwise rows 20a through 20h of grid No. 2.

In grid No. 3, the eight lengthwise rows each include three brick so there are 24 lengthwise brick in the grid. There are 14 crosswise rows, each including four brick so the grid includes 56 crosswise brick, and there a total of 80 brick in the grid.

Positioned on top of grid No. 3 is grid No. 4, which is arranged in the pattern of FIG. 8 discussed above, and is the pattern which is the same as grid No. 2.

Positioned on top of grid No. 4 is grid No. 5. This grid is provided with a pattern as illustrated in FIG. 10.

Grid No. 5 is, again, provided with eight lengthwise rows 31a through 31h, wherein each row includes three spaced brick which provide three groups of brick, 32a through 32c, which extend across the stack. Here again, the grid is provided with fourteen crosswise rows, each consisting of four brick. The crosswise rows are designated 33a through 33d, 33h through 33j, 33n through 33p, and 33t through 33w. The group of crosswise rows 33a through 33d are positioned between the cross group 32a and the end. The crosswise rows 33h through 33j are positioned between the groups 32a and 32b. Similarly, the rows 33n through 33p are positioned between the groups 32b and 32c, and the rows 33t through 33w are between the group 32c and the other end of the stack. Here again, the lengthwise lanes 22b, 22d and 22f are in alignment with the lateral lanes 27a, 27b and 27c, between the crosswise brick. Grid No. 5, like grid No. 3, has eighty brick but the patterns are different.

Figure 10:
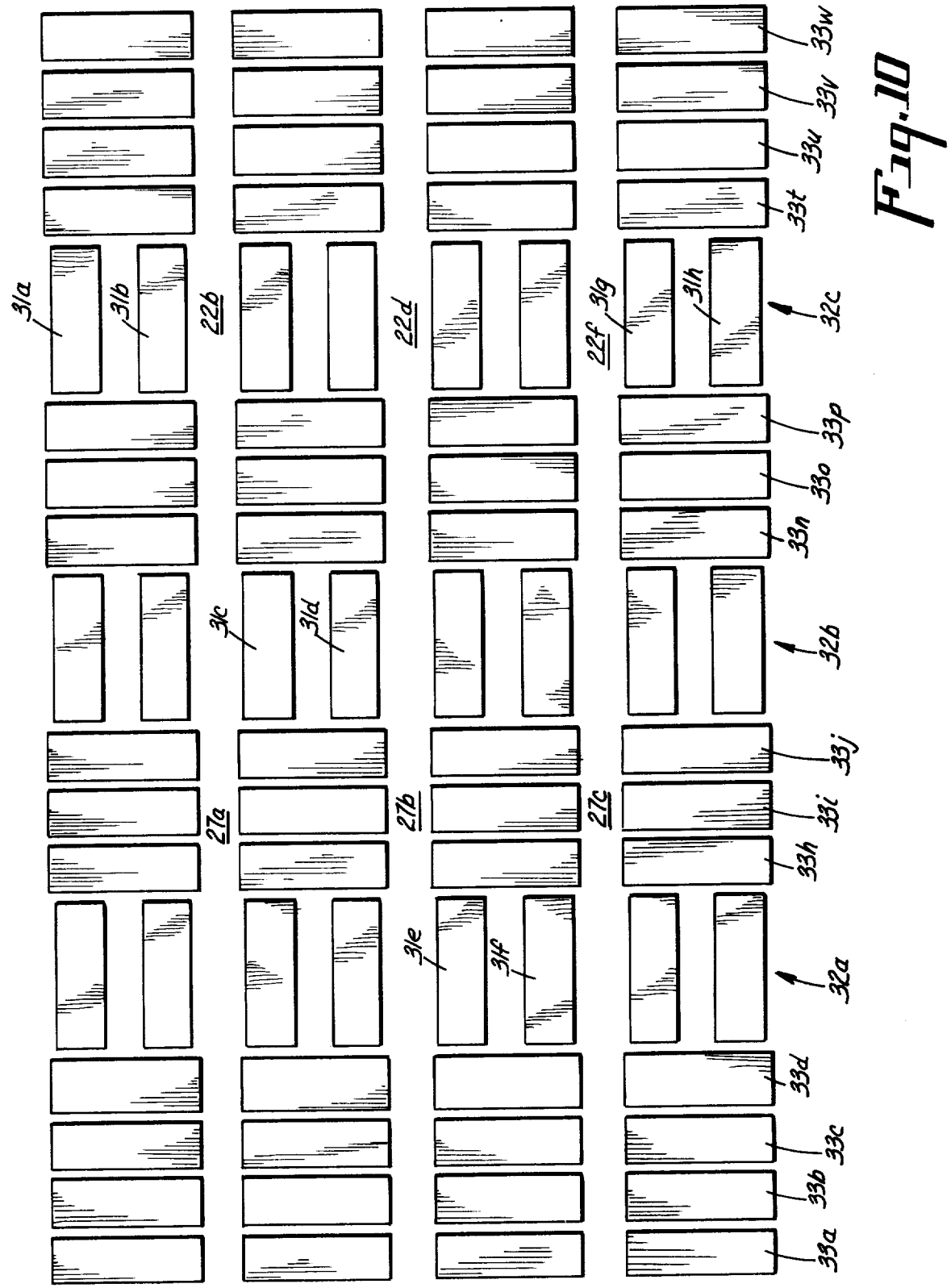
FIG. 10 illustrates the arrangement of the fifth and ninth grids from the bottom of the stack.
Figure 11:
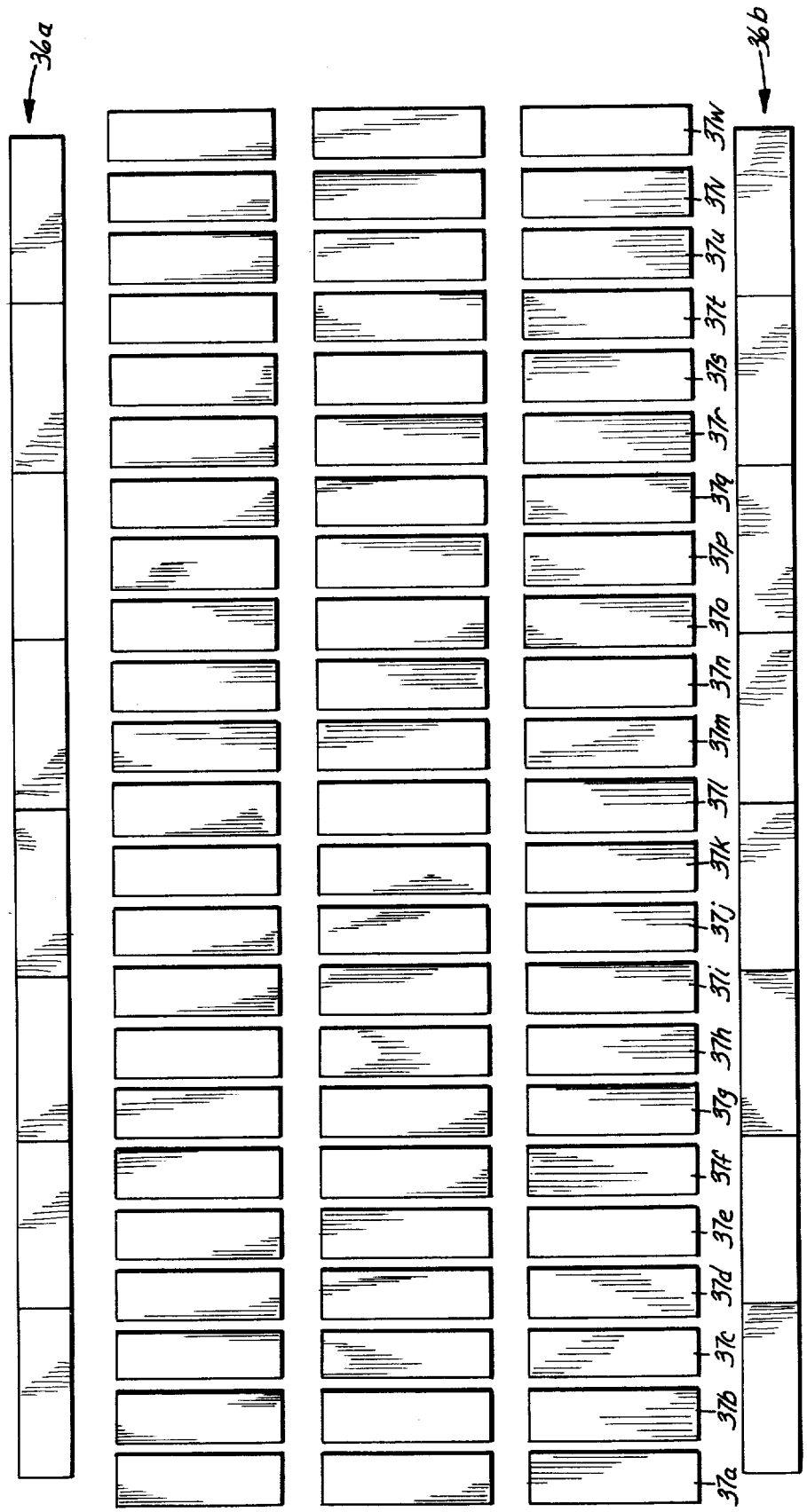
FIG. 11 illustrates the arrangement of the sixth and the tenth grids of the stack.

Positioned on grid No. 5, illustrated in FIG. 10 is another grid, No. 6, as illustrated in FIG. 11. This grid includes two outside lengthwise rows of abutting brick, 36a and 36b. These rows each provide eight aligned and abutting brick with their ends spaced in from the ends of the stack because of the fact that a central space is not provided between the brick, as is the case in grid No. 2.

Positioned between the rows 36a and 36b are twenty-three crosswise rows, 37a through 37w, with each crosswise row containing three aligned but axially spaced brick. It should be noted that the location of the crosswise brick is shifted with respect to the crosswise brick and the other grids, which contain four brick in each row so that cross tieing is provided between rows of lengthwise brick which are not tied by other courses such as, for example, course three. Grid No. 6 contains 16 lengthwise brick and 69 crosswise brick, for a total of 85 brick.

Figure 12:
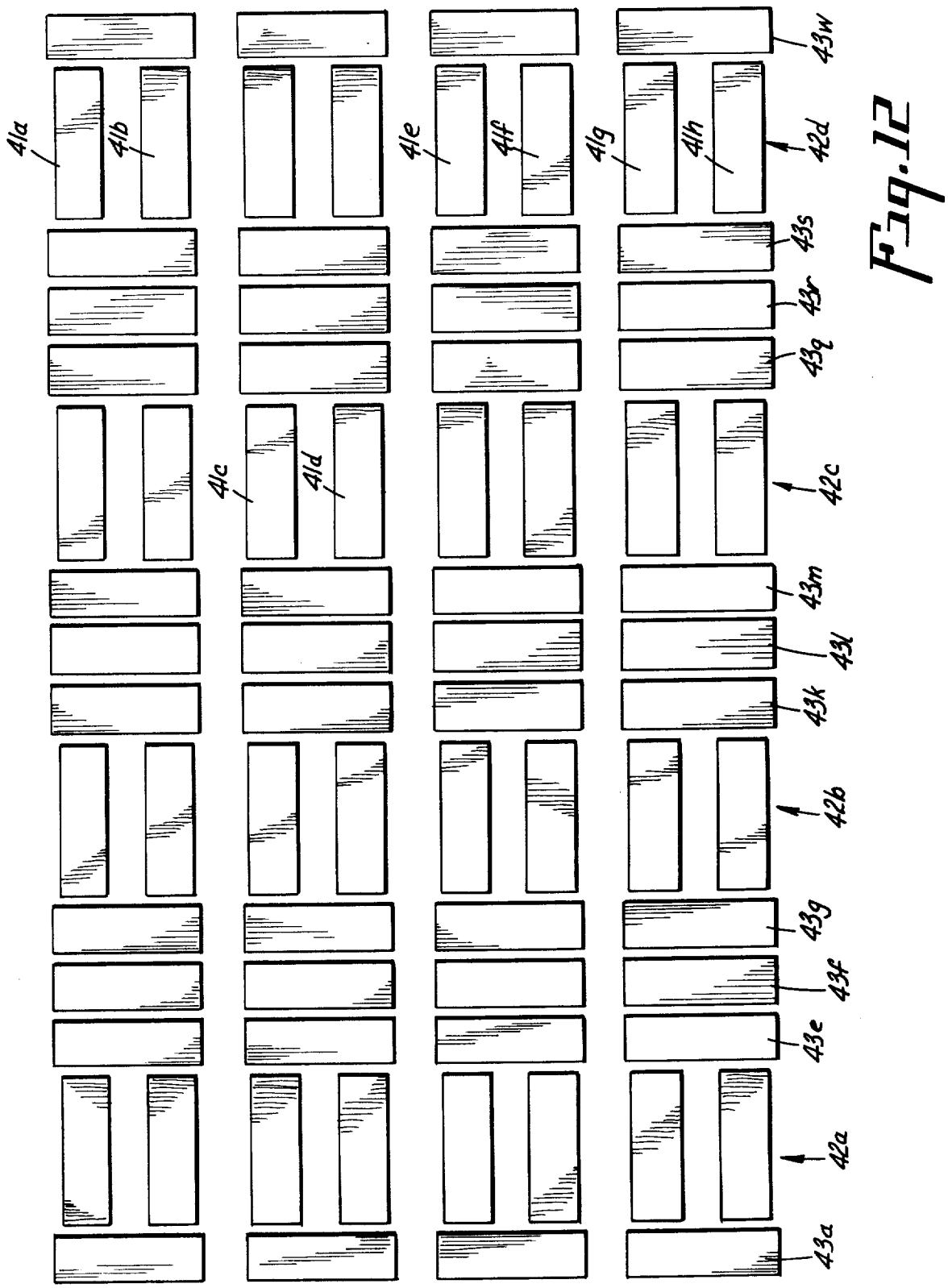
FIG. 12 illustrates the arrangement of the brick in the seventh and the eleventh grids in the stack.

Positioned above grid No. 6 as illustrated in FIG. 11, is grid No. 7, which has an arrangement pattern as illustrated in FIG. 12. In grid No. 7 there are eight lengthwise rows, 41a through 41h, with each row containing four axially spaced bricks. The four bricks in each row cooperate to provide crosswise extending groups 42a through 42d. The grid also includes crosswise rows 43a, 43e through 43g, 43k through 43m, 43q through 43s, and 43w. The pattern is arranged so that group 42a is spaced from the end of the stack by the cross row 43a and is spaced from the group 42b by the cross rows 43e through 43g. Similarly, the cross group 42c is spaced from the cross group 42b by the cross rows 43k through 43m and the group 42d is spaced from the group 42c by the cross group 43q through 43s. The row 43w is located between the group 42d and the other end of the stack. In the grid No. 7 there are 76 brick.

Positioned above the grid No. 7 is grid No. 8, which has a pattern, as illustrated in FIG. 8 described above.

Grid No. 9 has a pattern, as illustrated in FIG. 10. Grid No. 11 is formed with a pattern of FIG. 12 and grid No. 12 has the pattern of FIG. 8.

In the illustrated stack there are 180 brick in grid No. 1, 64 brick in each of grids No. 4, No. 6, No. 8 and No. 12, 80 brick in grid No. 3, 80 brick in each of grids No. 5 and No. 9, 85 brick in grids No. 6 and No. 10, and 76 brick in grids No. 7 and No. 11, for a total of 998 brick in the entire stack.

The particular stack 10 provides a great degree of stability, since the various grids are arranged to provide a tieing action which supplements the tieing actions of other grids and cooperates to provide a very stable total stack. It should be understood, however, that other patterns are possible within the scope of this invention and that stacks having greater or lesser numbers of grids can be produced in accordance with the present invention.

The novel and improved stack, in accordance with this invention, is arranged to permit powered mechanical stacking in an automatic manner. In each of the grids, which includes rows of brick extending lengthwise of the stack in combination with rows of brick extending crosswise of the stack, the longitudinal lanes between the lengthwise rows are proportioned to be aligned with the lateral lanes between the crosswise rows of brick. Consequently, it is possible to form each of these grids by a sequence including a first operation of gripping the lengthwise rows along their entire length with a gripper that extends along the longitudinal lanes and a second operation of transferring the gripped brick to the stacking location. Subsequently, the brick in the crosswise rows are gripped on their end by grippers which extend along the lateral lanes. The gripped crosswise rows are then deposited at the stacking location to complete the grid. Since the lateral lanes lie in alignment with the longitudinal lanes between the lengthwise rows, but are slightly narrower, the grippers which extend along the entire length of the stack and grip the ends of the crosswise brick can move down between the lengthwise rows already positioned in the stack without interference and release the crosswise rows to complete any given grid.

Similarly, the spacing between the crosswise rows is selected so that in the illustrated embodiment any three crosswise rows can be eliminated to provide the proper space to receive a crosswise group of lengthwise brick. Consequently, selective elimination of three crosswise rows at the proper location in the grid permits the accommodation of the crosswise groups of lengthwise brick. However, the pattern of crosswise rows when none of the crosswise rows are eliminated includes 23 crosswise rows, and this number is reduced by multiples of three to accommodate the crosswise groups of lengthwise brick.

The spacing in which the elimination of three crosswise rows accommodates a crosswise group of lengthwise brick, is determined to a certain extent by the various proportions of the brick. If the brick are to be stacked, which have a different length to width ratio, other proportions can be used within the scope of this invention.

THE ILLUSTRATED APPARATUS

Figure 1:
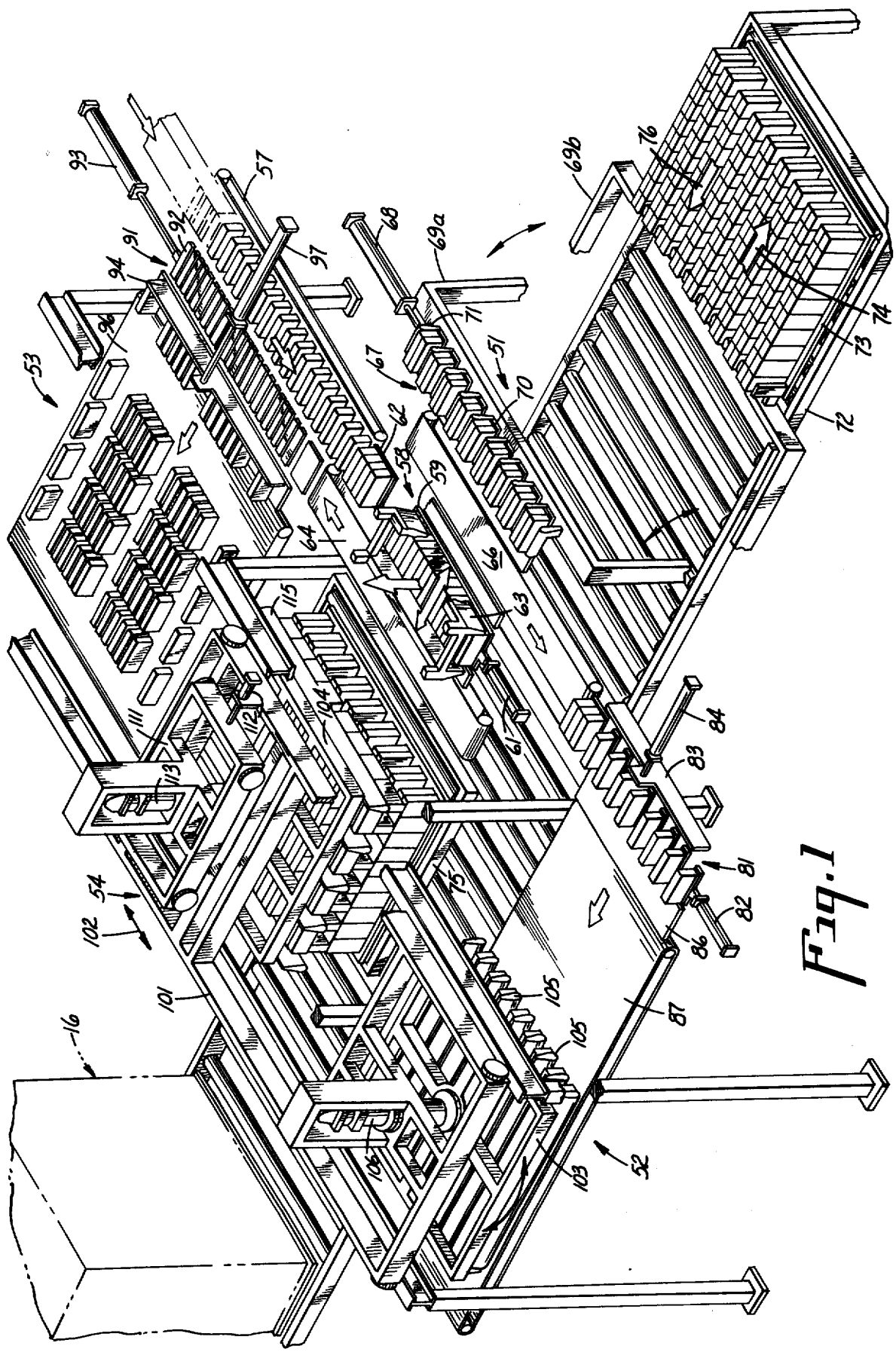
FIG. 1 is a schematic perspective view, with parts removed for purposes of clarity and illustration, illustrating one preferred apparatus in accordance with the present invention, for forming or setting a stack of bricks for firing.

FIG. 1 illustrates a preferred embodiment of an apparatus for forming a stack of brick such as the stack 10 illustrated in FIG. 6. This apparatus, although an integrated system, can best be understood by considering the subsystems which perform particular functions.

A first subsystem 51 functions to form grid No. 1, consisting of brick which are soldier set on their ends. A second subsystem, indicated generally at 52, operates to establish the patterns of lengthwise rows of brick for the grids No. 2 through No. 12, and a third subsystem, indicated generally at 53, establishes the patterns of crosswise rows for the grids containing such patterns. The forming of the stacks occurs on an elevator subsystem 54, and a gripper transfer subsystem 56 functions to transfer the grids from the second and third subsystems to the elevator station where they are deposited to form the completed grids. The various subsystems cooperate to completely mechanize and completely automate the formation of the stack.

The green brick are supplied to the machine by a feed belt type conveyor 57 from a supply of brick. Such supply may be of any type suitable for producing individual brick in the green state. Located at the discharge end of the supply conveyor 57 is a transfer mechanism 58 having a support plate 59, adapted to receive brick from the supply conveyor 57 and to support such brick and a compacted line of laterally abutting brick. The support plate is movable by a piston and cylinder actuator 61 from a position against a transfer plate 62 so that bricks can slide onto the support plate 59 from the conveyor 57 to a position spaced from the transfer plate 62, as illustrated in FIG. 1, so that the column of brick supported by the plate 59 is separated from the column of brick being supplied to the machine. The length of the support plate 59 is arranged to accommodate 18 brick which corresponds to the number of brick which are set in each operation of the first subsystem 51, to form the nine double rows of brick of the first grid. The transfer mechanism 58 also includes a transfer pusher 63, which is provided with a wall face on each side of a column of brick supported by the support plate 59. The pusher is mounted for powered movement by means not illustrated, from the illustrated position in which it fits over a column of brick on the support plate in both lateral direction. The transfer pusher is also vertically movable so that it can be moved over a column of brick being formed on the pusher plate back to its initial position, which is the illustrated position in FIG. 1.

Located on one side of the support plate 59 is a first belt conveyor 64, which receives brick from the support plate and supplies such brick to the third subsystem 53 in a manner described below. Located on the opposite side of the support plate is a belt conveyor 66 which receives brick and transports them to the second subsystem 52. Located on the side of the belt 66, remote from the support plate 59, is a spreader mechanism 67 which constitutes part of the first subsystem 51. Bricks are supplied to the spreader mechanism 67 by the action of the transfer pusher 63, when it moves across the conveyor 66 to the spreader mechanism 67.

The spreader mechanism 67 includes nine separate spreader plates 70, each of which is proportioned to support two brick of the 18 brick delivered by the transfer pusher 63. The spreader plates are movable toward and away from each other between a closed position in which they receive a compacted column of brick and an opened position in which they space the brick in nine spaced pairs. An actuator 68 powers the spreader to move the spreader plates 70 between the opened and closed position. The details of the structure of the spreader 67 are described herein in a later part of this specification.

After the transfer pusher 63 positions a column of eighteen abutting brick on the spreader 67, it is raised clear of the column so that it can return to a position over the support plate 59. Also, the support plate 59 is returned to its brick receiving position by the actuator 61 so that the supply conveyor can commence loading of the next column of brick on the support plate. Preferably, the loading of the support plate commences before the transfer pusher 63 returns to the illustrated position to reduce the cycle time required for the machine.

After the column of brick have been separated to the condition illustrated, a gripper transfer assembly 69 is pivoted up to its raised position illustrated at 69a. For purposes of illustration, the pivot support of the gripper transfer assembly 69 is not illustrated, but is located so that the transfer assembly can be oscillated back and forth through an angle of 90° between the position of 69a and the position of 69b.

Mounted on the transfer assembly 69 are ten inflatable grippers 71, porportioned to fit in between the pairs of brick supported by the open spreader 67 and to fit adjacent to the outside pairs of brick on the spreader. These grippers are preferably pneumatically operated and when exhausted are sufficiently narrow to fit between the pairs of brick on the spreader 67, but when inflated expand laterally to grip the side faces of each pair of brick. In the U.S. Pat. No. 3,716,264, assigned to the assignee of the present invention, a suitable type of inflatable gripper is disclosed and claimed.

As soon as the bricks are gripped, a power mechanism (not illustrated) swings the gripper transfer assembly 69 from the receiving position 69a to the delivery position 69b. Since the pivotal movement of the transfer assembly is through 90°, the brick are turned to a vertical position during such transfer.

A roller conveyor 72 positions a stacking board 73 to receive the brick from the gripper transfer 69 when it is in the delivery position 69b. The stacker board 73 is illustrated in FIG. 1 as fully loaded with a full grid No. 1. However, the loading of the grid is accomplished by positioning the stacker board 73 so that it receives the first row of pairs of brick adjacent to the forward edge, as illustrated, and then is indexed by the conveyor 72 forward through a distance substantially equal to the width of the first row so that a second row can be positioned on the board by the transfer 69. The grid is formed by progressively depositing nine pairs of spaced bricks and then indexing the board forward to a position to receive the next nine pairs of brick and repeating such cycle until the full grid No. 1 is loaded on the stacker board 73. The direction on indexing movement is indicated by the arrow 74.

After the stacker board is fully loaded, the conveyor 72 is operated while the transfer gripper 69 is raised clear of the brick thereon, in a direction of the arrow 76 to the stacking location in which the stacking board 73 is positioned on the elevator 75. The elevator 75 then raises the stacking board 73 to position the top of the grid No. 1 to receive the brick forming grid No. 2. The elevator then lowers to position the grid No. 2 to receive the grid No. 3, and so on, until the stack is completely formed. When the full stack 10 is formed, the elevator lowers the stacking board 73 back to the conveyor 72, which subsequently moves the fully formed stack to the delivery position in which the stack is illustrated in phantom.

The second subsystem 52, which functions to establish the pattern of lengthwise rows of brick in the grids, includes a second spreader 81 aligned with the conveyor 66. This spreader includes eight spreader plates which are movable by an actuator 82 between a closed position in which the spreader receive a compacted column of eight brick with one brick supported by each plate and an opened or spread position is illustrated in which each spreader plate and a brick supported thereby is spaced from the adjacent brick by a predetermined amount. The spacing established by the spreader 81 is arranged to establish the lanes of the proper width, as illustrated in FIG. 8. A pusher 83, powered by an actuator 84, operates to push the brick from the spreader 81 across a stationary plate 86 to a conveyor 87 on which the brick are assembled to form the pattern of lengthwise rows of brick for the various grids.

The pusher 83 is provided with a structure which is discussed in detail later in this specification, which is operable to selectively push bricks from only selected spreader plates and to leave some of the brick on some of the spreader plates to produce the various patterns required in the various grids. In grids No. 2, No. 4, No. 8 and No. 12, however, the pusher 83 operates to move all eight brick from the spreader 81 to the conveyor 87, since these grids require a full eight rows of brick.

After a group of brick have been moved from the spreader 81 to the conveyor 87 by the pusher 83, the conveyor is indexed forward so that a subsequent group of bricks can be transferred from the spreader to the conveyor. In the instance of the formation of grids No. 2, No. 4, No. 8 and No. 12, the conveyor is indexed forward a distance equal to the length of the brick through four cycles to produce the group 19a of abutting brick containing four abutting brick in a group. During the next cycle the conveyor 87 is indexed through a greater distance to provide the space 21, illustrated in FIG. 8, and is subsequently indexed forward a distance equal to the length of the brick until the second group 19b is formed.

In instances in which the number of lengthwise rows of brick is less than eight, such as, for example in grids No. 6 and No. 10 illustrated in FIG. 11, the pusher operates to move bricks only from the end spreader plates of the spreader and the bricks resting on the other or central spreader plates, remain on the spreader. In all other grids of a stack formed in accordance with the illustrated embodiment, all eight brick are removed from the spreader 81 by the pusher 83 during each cycle of operation. In the instance of the forming of the grids No. 6 and No. 10, the indexing operation of the conveyor 87 is modified so that the space 21 is not provided.

In the instances in which brick remain on the spreader 81 when selected brick are pushed by the pusher 83 from the spreader, the actuator 82 closes the spreader and the conveyor 66 moves additional brick onto the spreader until it is again fully loaded. In the instance of the formation of the grids No. 6 and No. 10, it is only necessary to supply two additional brick to the spreader 81 during each cycle, since the pusher only operates to remove two brick from the spreader. However, in other instances in which a full compliment of eight brick are removed from the spreader by the pusher 83, it is necessary to supply additional brick to completely reload the spreader.

The same transfer pusher 63 functions to deliver the brick to the conveyor 66. When delivering brick to the conveyor 66, the transfer pusher only moves the compacted column to the conveyor 66 and does not transfer the brick all the way to the spreader 67.

The third subsystem 53 includes a spreader 91 having 23 spreader plates 92, which are operated by an actuator 93. When the spreader plates are in a closed position, they are adapted to receive from the conveyor 64 a full compliment of 23 abutting bricks in a column. Once loaded, the actuator 93 operates to open the spreader plates to provide a predetermined spacing between each plate and the particular brick supported thereby. Here again, a pusher 94 is provided to slide the brick laterally off of the open spreader 91 onto a belt conveyor 96. The pusher 94 is operated by an actuator 97 and includes means to selectively leave predetermined bricks on the spreader to form gaps as required for the pattern of any particular grid.

The rows of brick positioned on the conveyor 96 constitute the crosswise rows in the various grids. In FIG. 1, the pattern illustrated of crosswise brick is a pattern required for grid No. 3. In this pattern the end bricks are pushed by the pusher 94 from the two end spreader plates 92. In addition, the bricks are pushed from the sixth through tenth spreader plates from each end so that two groups, each including six brick, are transferred with the end brick to provide the illustrated pattern. After the pusher 94 pushes a course of brick from the spreader, it retracts and the spreader is closed for reloading. At the same time, the conveyor 96 indexes to provide the proper spacing and positioning for the next course of bricks to be pushed by the pusher. In the instance illustrated wherein nine brick remain on the spreader, it is merely necessary to supply fourteen additional brick to reload the spreader completely with a full compliment of 23 brick. Here again, the pusher transfer 63 operates to supply the conveyor 64 with the brick necessary to fill the spreader 91.

When the elevator positions the uppermost grid thereon to receive a subsequent grid, the gripper transfer 56 operates to first grip a pattern of lengthwise aligned brick for the particular grid to be positioned in the stack from the conveyor 87 and transport such pattern to and deposits the pattern on the stack being assembled on the elevator. Subsequently, the gripper transfer grips a pattern of crosswise brick corresponding to the pattern previously deposited in the stack, which has been formed on the conveyor 96 and transfers such pattern to the stack positioning it in an interleaved manner to complete the particular grid involved.

The gripper transfer includes a carriage 101 supported on the frame of the machine for reciprocating movement back and forth in the direction of the arrow 102 by a power actuator (not illustrated). Two separate gripper frames 103 and 104 are carried by the carriage 101 as the carriage moves back and forth. The gripper frame 103 is associated with the second subsystem 52 and functions to grip the pattern of bricks on the conveyor 87 and to transport such patterns to the stack being formed. The frame 104 is associated with the third subsystem 53 and functions to grip patterns resting on the conveyor 96 and to transfer such patterns to the stack being formed.

The gripper frame 103 is mounted on the carriage 101 for vertical movement by an actuator 106 and is rotatable through an angle of 90° by an actuator (not illustrated). Nine elongated, inflatable grippers 105 are carried by the frame 103 and are positioned to fit on opposite sides of the lengthwise rows assembled on the conveyor 87 when the frame is lowered by the actuator 106. These grippers are preferably of the general type, disclosed and claimed in the U.S. Pat. No. 3,716,264 mentioned above.

When inflated, the grippers 105 engage the opposite side faces of each brick in the row, regardless of whether or not the row is full or is composed of axially spaced brick. As soon as the grippers 105 are inflated to grip the entire pattern of brick located on the conveyor 87, the frame 103 is lifted by the actuator 106 to raise the pattern off of the conveyor 87 for transport to the stacking position. The carriage 101 is then moved to the right, as viewed in FIG. 1, to position the gripper frame 103 over the stack and the frame is rotated through 90° so that the pattern of brick held and transported by the frame is turned to align the rows with the lengthwise direction of the stack being formed at the elevator position.

As mentioned previously, the elevator positions the uppermost brick supported thereby to receive a subsequent grid. The frame lowers to the stack and when properly positioned by the frame 103, the grippers 105 are exhausted to release the pattern of brick so that it rests on the grid previously positioned in the stack.

The carriage 101 and the mounting of the two frames 103 and 104 is arranged so that when the frame 103 is positioned to deposit a pattern of brick on the stack, the frame 104 is positioned to grip a pattern of brick located on the conveyor 96.

The frame 104 is supported from a cross carriage 111, which is laterally movable with respect to the carriage 101 by an actuator 112. Further, the frame 104 is vertically movable with respect to the carriage 111 by a support actuator 113.

Mounted on the frame 104 are five elongated, inflatable grippers 115, which are proportioned and located so that they fit into the lateral lanes formed in the patterns on the conveyor 96, and are adapted to grip the ends of the brick in such pattern. The grippers 115 are sufficiently long so that they are capable of gripping a full 23 crosswise rows, as in the case of the forming of grids No. 6 and No. 10. However, when gaps are provided between the rows to accommodate the lengthwise brick, the operation of the grippers 115 is not affected. When the frame 104 is properly positioned over the conveyor 93 and the pattern of bricks located thereon by the proper positioning of the main carriage 101 and the cross carriage 111, the actuator 113 is operated to lower the frame so that the grippers extend adjacent to the ends of all of the brick in the pattern. When this is done the grippers are inflated to grip the ends of all of the brick in the pattern and the frame 104 is raised so that the next movement of the carriage 101 to the left, as viewed in FIG. 1, transports the frame 104 to a position over the elevator 54.

In most of the grids the pattern of crosswise rows of brick includes four brick in each row and therefore, the actuator 112 positions the cross carriage in its normal position to deposit the pattern of crosswise rows within the pattern of lengthwise rows previously positioned in the stack by the frame 103. Various elements are proportioned and the grids are arranged so that the grippers 115 extend along the longitudinal lanes between the lengthwise rows of brick previously positioned in the stack, so interference is not encountered. When properly positioned, the actuator 113 lowers the frame 104 so that the full pattern can be released by exhausting the grippers to complete the formation of the particular grid involved.

In the instance of the forming of the grids No. 6 and No. 10, the crosswise rows of brick contain only three bricks in each row and they are offset laterally from the normal location of the brick in the crosswise rows. Consequently, during the formation of the grids No. 6 and No. 10, the crosswise rows assembled in the pattern on the conveyor 96 only contains three brick in each row. During the transfer of the pattern by the movement of the carriage 101, the actuator 112 moves the cross carriage 111 laterally to position the pattern in the offset positioned required for these particular patterns and the brick of the pattern are released in the desired position.

The two subsystems 52 and 53 are operated to progressively form in cooperation with the gripper transfer subsystem 56, the various grids No. 2 through No. 12 on the stack. As each grid is positioned in the stack, the elevator is lowered to receive the subsequent grid until all twelve grids are completed. At this time, the elevator lowers the stack until the board 73 is again, resting on the conveyor 72 and the conveyor 72 operates to transport the stack out of the machine to the delivery position illustrated by the phantom view of the stack 16.

In this specification, the controls of the machine for controlling the operation of the various component systems are not illustrated. However, suitable controls for the various drive mechanisms are interconnected to program the various operations of the machine to perform the function described in detail. To the extent possible, the control should be arranged so that various operations are performed simultaneously to reduce the total cycle time of forming a stack and to increase to the maximum extent the output of the machine. For example, the establishment of the patterns of brick on the two conveyors 87 and 96 is performed while the gripper transfer is operating to position a prior pattern in the stack. Similarly, the formation of the patterns of grid No. 2 can be performed at the same time the grid No. 1 is being assembled by the first subsystem.

FIG. 2 illustrates schematically an inverter which is provided in the machine when it is desired to invert selected brick before positioning such brick in the stack. Such inverter is preferably located at the lead end of either of the conveyors 87 or 96, or at the lead end of both conveyors if inversion is required for both crosswise and lengthwise rows. The inverter includes a rotatable support shaft 121 journaled for rotation on frame members 122 by a rotary actuator 123. A pair of arms 124 and 126 are mounted on the shaft 121 and support at their outer ends a rectangular gripper frame 127.

A second actuator 128 of the piston and cylinder type is connected between the frame 127 and the arm 126 to control the position of the frame so that it is horizontally aligned with the conveyor 129, both when positioned to grip a group of brick for inversion, as illustrated, and after the shaft 121 is rotated through a sufficient angle to position the frame for discharge of the inverted brick. The shaft 121 is mounted sufficiently above the surface of the conveyor so that brick can pass under the frame and the shaft when the frame is raised, for example, when the particular groups of brick are not to be inverted. Because the shaft 121 is located above the surface of the conveyor belt 129, it rotates through an angle greater than 180° and it is necessary to provide the actuator 128 to properly position the frame with respect to the conveyor at the discharged position.

Mounted on the frame 127 is an inflatable gripper 131, which operates to grip the ends of the brick and press them against the opposed frame member to properly grip all of the brick in a particular group being inverted.

FIG. 3 schematically illustrates a pusher having means to selectively leave certain predetermined brick on an associated spreader when the pusher operates. Such pusher is not illustrated as one of the particular pushers 83 or 94, but is illustrated to provide an understanding of one type of a structural arrangement which can be utilized in such pushers. A pusher plate 141 is guided on support rods 142 and is powered by an actuator 143. Pivotally supported on the face of the pusher are a plurality of hinged panels 144, 146 and 147. Connected to each panel is an actuator 148, 149 and 151, respectively. When a brick supported by a spreader bar in alignment with a panel 146 is to be pushed from the spreader, such panel is maintained in the closed position illustrated. However, when the operation of the pusher is to be performed while leaving such a brick on the spreader, the actuator 149 is operated to raise the panel 146 so that it does not engage the brick. Obviously, in such an arrangement the panel dimensions and the operating arms must be arranged to provide the necessary surface and clearance to correspond to the dimensions of the brick being acted upon.

FIG. 4 and FIG. 4a schematically illustrate a type of spreader mechanism suitable for use in the present invention. In such mechanism, spreader bars 156 are supported by support rods 157 for movement relative to the rods along their length. Each spreader bar 156 is connected to the adjacent spreader bar by a lost motion type connection such as a chain 158 in the illustrated embodiment. When the actuator 159 extends, the various spreader bars are pushed together until they abut and are in position to receive a column of brick. Once the brick are loaded on the spreader bars, the actuator 158 retracts and through the connection of the chains 158 produces a predetermined spacing between each spreader bar and its adjacent spreader bars. It should be recognized that other forms of lost motion connections may be provided within the scope of the present invention.

FIG. 5 illustrates a gripper frame of the type described above in connection with the two frames 103 and 104 in which means are provided to axially compact selected rows of brick, which are transported by the gripper frame. In the illustrated embodiment, two pairs of opposed actuators 166 and 167 are each connected to rocker arm 168, which extend down into alignment with a row of bricks carried by the frame. These actuators are operable to actuate their associated arms 168 to engage the end bricks in a given row of bricks and to push them into a compacted line in which the brick in a given row are in abutting relation. Preferably, such arms are operated to compact the particular row involved immediately before the grippers are inflated while the row of brick rest on the associated conveyor belt. When the operation occurs at this point in the cycle, there is no liklihood of the compacting operation of the mechanism to cause tipping or sliding of brick within the stack.

In the illustrated embodiment, the indexing of the stacking board 73 is preferably arranged so that sufficient clearance is provided to insure that scuffing of the brick does not occur when they are positioned on the board by the gripper transfer 69. However, it is desirable to insure that each of the nine double rows of the grid No. 1 is fully compacted. Therefore, a pusher system is provided to engage the opposite ends of the row and push the brick together so that they are in proper abutting relationship. This pusher mechanism has not been illustrated in the drawings in order to simplify the drawings and simplify the understanding of the present invention, but may be located at the stacking location.

In accordance with the present invention, the longitudinal lanes between the adjacent rows of lengthwise extending brick are located to receive the grippers, which support the crosswise rows. Such grippers for the crosswise rows are proportioned in relationship to the longitudinal lanes so that they fit down within the lanes between the lengthwise rows of brick without contact. Consequently, it is possible to separately grip the patterns of lengthwise rows and crosswise rows of brick and to conveniently and easily combine the two patterns in a single grid without complicated and special gripping structures.

Since the length wise rows are gripped on their lateral faces and the crosswise rows are gripped on their end faces, the grippers of the two different frames extend in the same direction during their depositing of the brick in the stack.

Although a preferred embodiment of this invention is illustrated, it is to be understood that various modifications and rearrangements may be resorted to without departing from the scope of the invention disclosed and claimed.

What is claimed is:

1. A machine for forming stacks of brick or the like having grids including intermixed first rows of lengthwise aligned brick and second rows of lengthwise aligned brick extending perpendicular to said first rows comprising first means for forming first patterns of first rows with longitudinal lanes between at least some of said first rows, second means for forming second patterns of said second rows with at least one lateral lane between the end faces of brick and said second rows, said first means operating to produce a plurality of different patterns which are combinable with related patterns formed by said second means to form grids including first and second rows, and transfer means operable to grip an entire pattern of rows along said lanes and to transfer and deposit such patterns at a stacking location, said transfer means thereafter operating to grip an entire related pattern of rows along its lane and to transfer and deposit such pattern in a prior pattern of rows with the lane thereof along one of the lanes of such prior pattern, without interfering with the brick in such prior pattern adjacent to said one of said lanes.

2. A machine for forming stacks of brick or the like as set forth in claim 1 wherein said first patterns are gripped first and said second patterns are gripped subsequently and positioned within said first patterns.

3. A machine for forming stacks of brick or the like as set forth in claim 2 wherein said first means includes a spreader operable to receive a column of abutting brick and to spread the brick in such column to provide spaces therebetween.

4. A machine for forming stacks of brick or the like as set forth in claim 3 wherein said first means includes a transfer means operable to transfer bricks from said spreader, and said spreader and transfer means operate with repeated cycles to establish said first pattern.

5. A machine for forming stacks of brick or the like as set forth in claim 4 wherein said spreader and transfer means are operable to establish a plurality of different first patterns by changing the spacing between said first rows in said first patterns.

6. A machine for forming stacks of brick or the like as set forth in claim 5 wherein said transfer means is a pusher and said pusher includes means operable to push selected brick from said spreader to provide different patterns.

7. A machine for forming stacks of brick or the like as set forth in claim 4 wherein said first means includes a support surface on which said first patterns are formed, said support surface being adapted to receive bricks delivered by said transfer means and being powered to move such brick to permit delivery of subsequent brick by said transfer means.

8. A machine for forming stacks of brick or the like as set forth in claim 7 wherein said support surface is provided by a powered conveyor.

9. A machine for forming stacks of brick or the like as set forth in claim 1 wherein said second means includes a spreader operable to receive a column of abutting brick and to spread the brick in such column to provide spaces therebetween.

10. A machine for forming stacks of brick or the like as set forth in claim 9 wherein said second means includes a pusher operable to push brick from said spreader, and said pusher and spreader operate with repeated cycles to establish said second pattern.

11. A machine for forming stacks of brick or the like as set forth in claim 10 wherein said transfer means is operable to turn one of said first or second patterns through an angle of substantially 90° to align said lateral lanes with said longitudinal lanes.

12. A machine for forming stacks of brick or the like as set forth in claim 1 wherein said transfer means is operable to turn one of said first or second patterns through an angle of substantially 90° to align said lateral lanes with said longitudinal lanes.

13. A machine for forming stacks of brick or the like as set forth in claim 1 wherein inverter means are provided to invert selected brick in said patterns.

14. A machine for forming stacks of brick or the like as set forth in claim 1 wherein third means are provided to form a grid including spaced rows of brick resting on their ends.

15. A machine for forming stacks of brick or the like as set forth in claim 14 wherein supply means are provided to supply brick to each of said first means, second means and third means from a single source of brick or the like.

16. A machine for forming stacks of brick or the like as set forth in claim 1 wherein said second means operates to form said one lateral lane with a width less than the corresponding longitudinal lane formed by said first means.

17. A machine for forming stacks of brick or the like having grids including intermixed first rows of lenthwise aligned brick and second rows of lengthwise aligned brick extending perpendicular to said first rows comprising first means for forming first patterns of first rows with a plurality of longitudinal lanes between at least some of said rows, second means for forming second patterns of said second rows with a plurality of lateral lanes between the end faces of brick in said second rows, said lateral lanes having a width less than the corresponding longitudinal lanes, said first means operating to produce a plurality of different patterns which are combinable with related patterns formed by said second means to form grids including first and second rows, a first transfer operable to grip and entire pattern of rows along said lanes and to transfer and deposit such patterns at a stacking location, second transfer means thereafter operating to grip an entire related pattern of rows along its lanes and to transfer and deposit such patterns in a prior pattern of rows with the lateral lanes thereof extending along corresponding longitudinal lanes of such prior pattern.

18. A machine for forming stacks of brick or the like as set forth in claim 17 wherein at least some of said grids are formed of brick in which substantially all of the brick therein are spaced from the adjacent brick.

* * * * *